Nov. 23, 1965   C. R. BORLEY ETAL   3,219,925
AUTOMATIC ELECTRONIC DISTANCE INDICATOR
Filed May 10, 1960                    2 Sheets-Sheet 1

INVENTOR
C.R. BORLEY
L.H. GUILFORD
BY
AGENT

United States Patent Office 3,219,925
Patented Nov. 23, 1965

3,219,925
AUTOMATIC ELECTRONIC DISTANCE
INDICATOR
Colin Roderick Borley, Hildenborough, Kent, and Leslie
Henry Guilford, Burgers Hill, Sussex, England, assignors to North American Philips Company, Inc., New York, N.Y., a corporation of Delaware
Filed May 10, 1960, Ser. No. 28,088
Claims priority, application Great Britain, June 25, 1959, 21,848/59
16 Claims. (Cl. 324—61)

This invention relates to apparatus for measuring linear dimensions or relative positions.

Various known linear distance measuring systems employ a measuring bar having a regular series of, for example, electric or magnetic discontinuities having a regular pitch or uniform spacing constituting a master scale, non-contacting means for detecting said discontinuities, and a fine measuring system for measuring distances smaller than the pitch of said discontinuities. Normally the output of a single detector does not show a sharp change at the discontinuity such as is needed to determine accurately the position of the discontinuity. Moreover, there is normally no change in the sign of the output such as would provide a null signal point together with directional indications for use in searching for such null point. Instead, the output usually varies between a maximum and a minimum at the pitch of the discontinuties in a smooth manner. For this reason it is usual to employ two detectors spaced apart along the bar so that the output of one is at a maximum when the output of the other is at a minimum. The two can be coupled in a bridge circuit which gives a null output when the two outputs are balanced. Two such nulls appear between any two successive discontinuities. Adjacent nulls are spaced apart by an amount which depends on the spacing of the two detectors. In high precision applications it is difficult to adjust the mutual spacing of the two detectors so as to make adjacent null separations equal. Moreover, where the system is manually operated with the aid of a null indicator such that the controls are operated in one sense or the other (depending on the sign of the error indicated) until the indication of balance is achieved, there is ambiguity inasmuch as successive null points provide error indications of alternate sense, and this type of indication is confusing to the operator.

According to one aspect of the invention, apparatus for measuring linear dimensions or relative positions comprises a measuring bar having a series of regularly spaced discontinuities having a constant pitch and extending along the full operative length of the bar so as to constitute a master scale, a first detector for providing an electrical output in response to the presence of a discontinuity, a second similar detector spaced from said first detector by a constant distance along the length of said bar, means for effecting relative movements between said bar and said detectors, an electrical bridge circuit for comparing the outputs of said detectors and providing a null output when the detector outputs are in a predetermined condition of balance while providing an error output of one sign or the other when the bar and detectors are in a relative position other than a null position, means for indicating null and error outputs of the bridge circuit, and discriminator means for rendering the indicating means inoperative at or near alternate null positions.

With such an arrangement, alternate null points are automatically prevented from appearing effectively on the indicating means. This has two beneficial effects. First, greater accuracy can be achieved since the accuracy of measurement no longer depends upon the mutual spacing of the detectors. Second, in the case of manual operation, all the null points that appear effectively on the indicator give error indications having the same sense, e.g. they all give an indication which passes gradually through a null point from positive to negative or from right to left so long as the measuring bar and detectors are given relative motion in the same direction. As for the unwanted nulls, the indicating means are rendered inoperative in the sense that it is no longer possible to obtain therefrom an error indication which is gradually reduced as the bar and detectors approach the position of an unwanted null.

The discontinuities may take various forms. Thus they may be of an electrical nature (e.g. changes in the conductivity of the bar), or of a magnetic nature (e.g. a series of spaced poles) or they may be optical discontinuities such as changes in transparency or reflectivity.

Various arrangements are known wherein a pair of detectors cooperates with a series of discontinuities spaced along a measuring bar. According to one known principle, the discontinuities are the successive turns of a conductive helical surface on the bar, while the detectors are constituted by shorter helical surfaces capacitively coupled thereto. The invention will be described hereinafter in greater detail as applied to such arrangements.

Various measuring systems utilizing capacitively coupled helical surfaces have been described in United States Patent, No. 2,611,964 issued September 30, 1952 to P. Buisson and entitled "Apparatus For Measurement By Variation of Electrical Capacity." Some of the systems described therein employ a measuring bar having a relatively long helical electrode capacitively coupled to a movable pair of shorter coaxial helical electrodes (referred to herein as "nuts") which are coaxial therewith and have the same pitch and sense. The two capacitances appearing between the nuts and the main electrode are connected in a bridge circuit having means for detecting a null when the two helical capacitances are balanced in the bridge circuit, the two nuts being spaced apart axially in such a way that the capacitance of one of them increases while that of the other decreases. Such a system is used to detect successive nulls as the nuts are given movement of translation along the length of the main helix of the measuring bar and such nulls have a spacing equal to half the pitch of the helices. As explained in the aforementioned patent, if the distance measured equals a whole number of pitch lengths plus a fraction of a pitch length, then said fraction may be ascertained by rotating the nuts together until a null is obtained. The fractional distance is then read on a circular scale associated with the nuts. Various advantages for these systems are set forth therein, in particular, the fact that there is no physical contact between the helices and therefore no wear and no mechanical friction. A further advantage lies in the fact that, since the nuts have several turns, inaccuracies in the formation of the main helix (and in the nuts) are averaged out to a material extent.

In the systems described in the aforesaid patent, both of the nulls occurring in a displacement of one pitch length are used, namely, the null at which the capacitance of a given nut is increasing and the null at which the capacitance of the same nut is decreasing.

According to a further aspect of the invention, apparatus for measuring linear dimensions or relative positions comprises a measuring bar having a conductive helical operative surface of constant pitch extending along its full operative length, a pair of shorter conductive helical detector surfaces (referred to herein as "measuring nuts") each having a plurality of turns of the same pitch and sense as those of the bar and coaxial therewith and capacitively coupled thereto, a nut carrier to which are secured rigidly both the said nuts with such mutual axial spacing that any point of any turn of the helical surface of one measuring nut is spaced from the corresponding point on any turn of the helical surface of the other nut by an axial distance substantially equal to an odd number of half-pitch lengths, means for effecting relative movement between said bar and said nut carrier, an electrical bridge circuit for comparing the capacitance between one nut and the bar with the capacitance between the other nut and the bar and providing a null output when the said capacitances are in a predetermined condition of balance while providing an error output of one sign or the other when the bar and measuring nuts are in a relative position other than a null position, means for indicating null and error outputs of the bridge circuit, and discriminator means for rendering the indicating means inoperative at or near alternate null positions.

With such an arrangement it is desirable to preserve the feature described in the aforesaid patent whereby relative rotation is applied between the bar and the nuts through an angle less than 360° to account for any fractional distance smaller than one pitch-length. In a preferred arrangement which preserves this facility, the discriminator means include an auxiliary conductive helical surface (referred to herein as the "discriminator nut") having the same pitch and sense as the helical surface of the bar, coaxial therewith and capacitively coupled thereto. The discriminator nut is rigidly secured to the nut carrier in a position spaced from both of the measuring nuts such that any point on any turn of its helical surface is spaced from the corresponding point on any turn of the helical surface of either of the other nuts by an axial distance equal, or approximately equal to an odd number of quarter-pitch lengths. The discriminator further includes means for determining the capacitance between said discriminator nut and the measuring bar, and means for rendering the indicating means inoperative whenever the capacitance of the discriminator nut is at, or is close to, its maximum value or minimum value.

With such arrangements the conductive helical operative surfaces of the measuring bar and those of the nuts may, if desired, be helical conductive surfaces deposited on cylindrical insulating members. Preferably, however, the surfaces are formed as physically projecting screw threads cut in metallic members.

In principle, the measuring bar also can be tubular with its helical surface provided internally, the nuts being located and guided concentrically within the bar. Preferably, however, the nuts and nut carrier are external to the bar since the operative surfaces of the nuts are shorter than the bar.

The elements of the measuring apparatus are used to ascertain the relative positions or displacement between two parts and, for this purpose, either the bar or the nut carrier may move while the other element is stationary.

Various A.C. bridge arrangements are possible for detecting accurately the null positions. In view of the inevitable presence of stray capacitances between each of the elements and ground, it is preferred to use a transformer bridge or Blumlein bridge so as to take into account such capacitances. Such an arrangement will be described hereafter with reference to the drawings.

The information obtained from the discriminator nut may be used in various ways to select alternate nulls. In one method, a further transformer bridge or Blumlein bridge is used wherein a capacitor having a constant capacitance value is employed in the arm of the bridge opposite to that of the third nut capacitance.

Apparatus according to the present invention may be applied to various devices wherein accurate positioning of a slidable member is desired. For example, in a jig boring machine which is employed for accurate machining operations, rectilinear movements of the table must be made with great precision in each of two orthogonal directions and means according to the invention may be associated with the table to permit measurement of such movements.

Specific embodiments of the invention will now be described by way of example with reference to the accompanying drawings in which.

Figure 2:
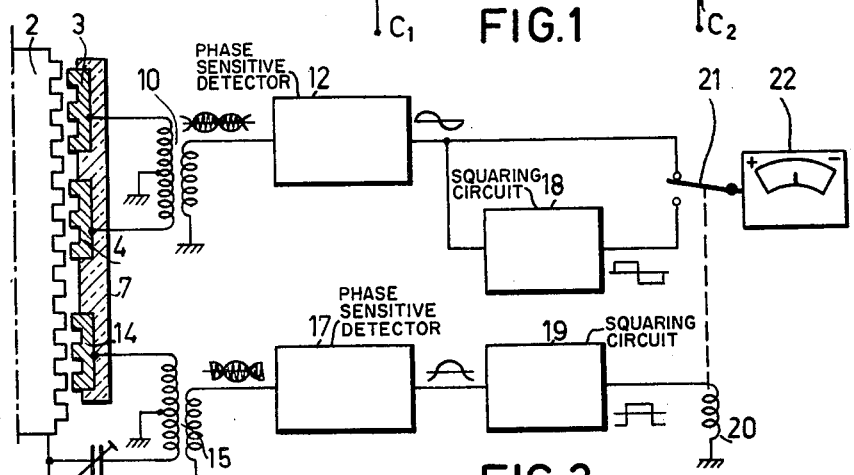
FIGURE 2 is a schematic diagram partially in block form, of the detector and indicator circuit and illustrating in diagrammatic form one half of the threads of the bar and nuts in simplified rectangular projections.
Figure 4:
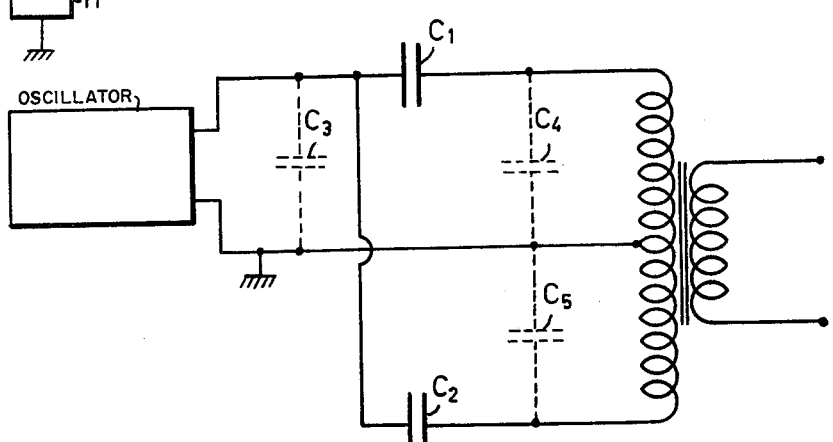
Figure 3:
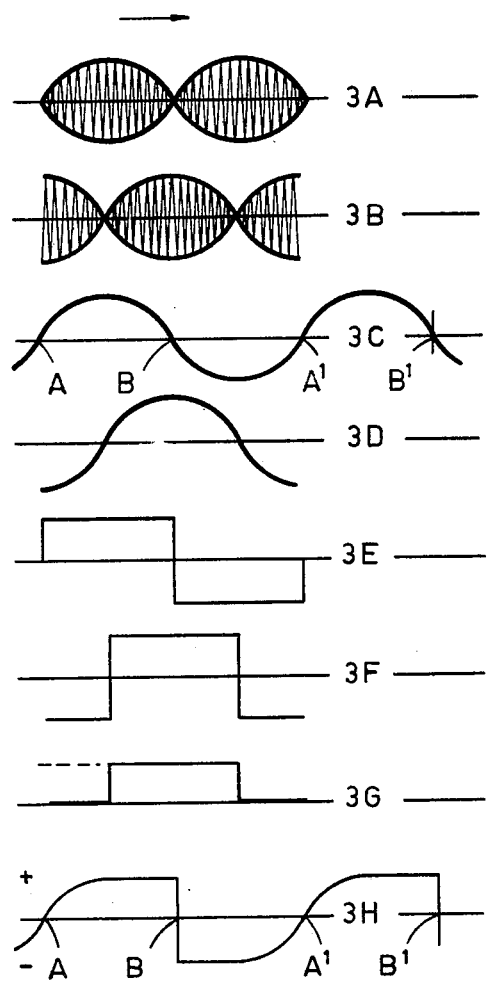

FIGURE 3 are waveforms helpful in explaining the operation of the circuitry of FIGURE 2 and in which the relative magnitude of the signals present at different points of the circuitry of FIG. 2 are plotted as a function of the displacement between the measuring bar and associated sensing nuts, the ordinate and abscissa axes thereof, representing relatively suitable units of signal magnitude and linear displacement, respectively; and FIGURE 4 is a schematic diagram, partly in block form, illustrating the bridge circuit of FIGURE 2 and associated relevant stray capacitances.

Referring now to the drawings, all the screw threads are single-start threads having a rectangular profile in which the thickness of the threads, as measured in a direction parallel to the axis, is equal to the spacing between adjacent threads measured in the same direction. This is a preferred arrangement since any large departure from such symmetry leads to loss of null resolution.

The operative surfaces 1 of the measuring bar (which is a screw 2) are sensed capacitively by a pair of non-contacting measuring nuts 3, 4 having operative surfaces 5, 6. These nuts are mounted in a carrier 7 and are insulated from one another and from the screw. Furthermore, all three elements are insulated from ground. The spacing between the threads of nut 3 and those of nut 4 is an odd number of half-pitch lengths. As the nut carrier passes along the screw or rotates around it, the capacitances between the bar and the two nuts vary from a maximum to a minimum in antiphase. At every half turn or half pitch the capacitances become equal.

The point at which these nut capacitances become equal is determined accurately by an A.C. bridge circuit comprising a center-tapped transformer 10 and an oscillator 11 connected so as to apply A.C. voltages to the bridge. The first graph (3A) of FIGURE 3 shows the A.C. output of the bridge and such output is detected by a phase-sensitive detector 12 so as to provide an envelope output as shown in graph 3C of FIGURE 3. The nulls A, A', etc., are spaced one thread pitch apart, and the presence of a plurality of threads in each of the nuts has the desired effect of averaging out pitch errors present in the length of the screw or bar covered by the nuts. The same applies to the nulls B, B', but the spacing between the A set of nulls and the B set of nulls can be effected by errors in the spacing between the nuts 3, 4 and by errors in machining the surfaces 5, 6. For this reason, as has been explained previously, only one set of nulls (e.g., the A set) is used for measurement.

Figure 1:
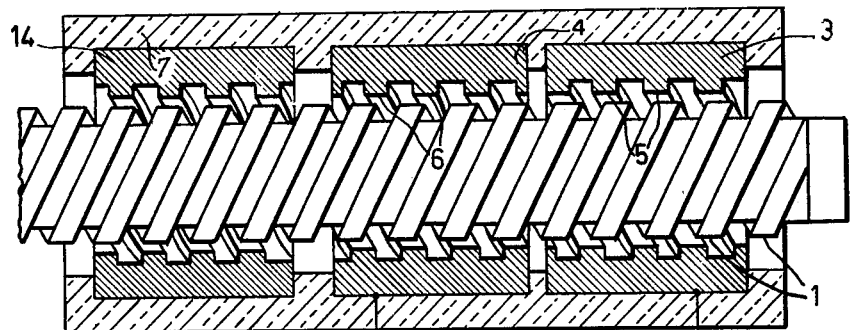
FIGURE 1 is a sectional view of an embodiment of this invention which illustrates a portion of the measuring bar and the nuts and nut carrier thereof.

Access to the unwanted set of nulls is prevented by the use of a third nut 14 which is shown in FIGURES 1 and 2. The same oscillator is used to apply an A.C. voltage between the bar and this third nut with the aid of a second transformer bridge 15 in which the third nut is balanced against a capacitor 16 of constant value. The output of the bridge 15 is shown in graph 3B, the corresponding envelope being obtained by a second phase-sensitive detector 17 as shown in graph 3D.

The threads of the third nut are displaced axially with respect to those of the other two nuts by a distance equal an odd number of quarter-pitch lengths so that each null in the output of nut 14 corresponds to a maximum or a minimum of the output of the first phase-sensitive detector 12. By this means, the output of the third nut can be used to gate the input to the display device so as to pass every other null of the detector output 3C (in this example the A set of nulls) while eliminating the intervening nulls. This may be done in various ways. For example, as illustrated in FIGURE 2, the two detector outputs may be squared in squaring circuits 18, 19 so as to provide the waveforms shown in the graphs 3E and 3F, respectively. The output of the squaring circuit 19 operates a relay 20 and a two-way switch 21 connecting the display device 22 to the output of the phase-sensitive detector 12. The energizing current for the switch 21 is represented by graph 3G. In one switch position the display device 22 is connected to the squaring circuit 18. Therefore, when an unwanted null occurs, the display is forced to switch over very rapidly. No matter how slowly the nuts are moved towards this null, the display will not show a null output. If the display is used by an operator as a directional guide to set up at a null, this null will now be inaccessible, the meter only showing full positive or full negative output. This condition is illustrated by graph 3H which shows the abrupt change-over in the display caused by the action of the squaring circuit at an unwanted B null.

In the other position of the switch, when the relay 20 is off, the display device is connected directly to the output of the phase-sensitive detector 12 and therefore it displays the gradual change-over from negative to positive which can be followed manually so as to adjust the machine in accordance with the left or right indications given (see nulls A and A' on display graph 3H).

Hitherto the question of stray capacitances has only been referred to briefly. Actually, the two bridge circuits shown are both of the Blumlein type (also known as the "transformator ratio arm" type) and they thus provide an indication of equal capacitance between the two measuring nuts even in the presence of the invitable stray capacitances. This is shown more clearly in FIGURE 4 wherein the measuring nut capacitances are indicated as C1 and C2, respectively, while the stray capacitances to earth of the bar and measuring nuts are shown as C3, C4 and C5, respectively.

FIGURE 1 shows an arrangement employing single-start threads. However, multi-start threads can be used provided that all the screw threads have the same pitch and the same number of starts. If $n$-start threads are used having a pitch of $p$ inches, the nut output waveform is repeated every $p/n$ inches and $2n$ nulls occur in $p$ inches of axial displacement. Similarly, the waveform is repeated $n$ times in one turn of the screw, $2n$ nulls occurring in one turn.

As regards the practical details of a system as illustrated in the drawings, it has been found (with steel nuts and a steel bar having a pitch of 0.1") that it is desirable that the axial depth of the screw threads be at least 0.025". However, increasing the depth beyond 0.025" has little effect so that 0.05" is a good practical value. The air gap between the threads of the nuts and those of the bar can be between 0.002" and 0.005". In this case, the measuring nut capacitances will be in the range of from 50-200 pf. The variation of these capacitances (from maximum to minimum) is about 20%, a typical range being from 200 pf. down to 160 pf. The oscillator frequency can be 25 kc., although other frequencies may be used within a range of 10 kc.–100 kc., depending on the transformer design.

The system illustrated may be employed to position a slide or table (e.g., of a machine tool) in the following manner. The nut carrier is mounted on the slide or table and is held against rotation during operation of the lead screw or equivalent drive means. Thus, while the lead screw is being rotated to set the slide or table at a desired position, the effective nulls appear successively on the display meter. Having reached the desired null by any available coarse setting means, and assuming that the measurement includes a fraction of a helix pitch, the fraction may be set up by releasing the nut carrier for rotation and applying rotation corresponding to the desired fractional distance. The lead screw is then rotated a further small amount until the meter is brought back to its null reading.

Alternatively, the fractional distance may be set up initially by rotation of the nut carrier, after which the slide or table is adjusted in a single operation until a null is indicated at or near the desired coarse setting.

If the thread pitch is 01", the meter will display an A null for every revolution of the nut carrier or for every 0.1" displacement of the slide or table. Micrometer means (not shown) may be provided for accurate rotation and angular setting of the nut carrier to any desired fractional distance smaller than 0.1". Alternatively such means may be provided to permit accurate rotation and setting of the measuring bar instead of the nuts.

As aforementioned, it is to be understood that the principles of our invention may be utilized in other arrangements utilizing other forms of eccentricities and, thus, while we have described the principles of our invention in connection with specific apparatus, it is to be clearly understood that this description is made by way of example only and not as a limitation to the scope of our invention as set forth in the accompanying claims.

We claim:

1. Measuring apparatus comprising a member having a series of uniformly spaced discontinuities disposed along a predetermined length of a given axis thereof, said discontinuities forming an integral helical conductive surface of said member having a pitch substantially equal to and coincidental with the spacing between said discontinuities and being proportional to a predetermined scalar quantity, first and second electrical sensor means in fixed relationship to one another and in predetermined capacitive sensing coupling relationships, respectively, with said discontinuities, each of said first and second sensor means comprising a helical conductive surface having the same pitch as said member, and being disposed concentrically about said member and said given axis to sense said discontinuities in a group of at least one discontinuity each to provide respective first and second output signals, each of said first and second output signals being proportional to the relative position of the respective sensor means with respect to the group being sensed thereby, means for causing relative movement of said first and second sensor means with respect to said group to vary said relative position and capacitance therebetween, each of said first and second sensor means having exclusive first and second relative positions for each discontinuity of the group being sensed thereby to provide a predetermined balanced condition for said first and second signals when both said sensor means are at said respective first relative positions and when both said sensor means are at said second relative positions, comparison means responsive to said first and second output signals to provide an indicating signal having first and second values in the presence and absence, respectively, of said balanced condition, said comparison means comprising a bridge circuit having the respective capacitances between each of the sensor means and respective groups being sensed thereby coupled in the respective arms thereof and output means for said indicating signal, and discriminating means comprising third electric sensor means in capacitive sensing coupling relationship with said member discontinuities and responsive to the relative positioning of said first and second sensor means with respect to said member to discriminate between the first values of said indicating signal related to a predetermined one of the two said first and second positions and the first value related to the other of the two said first and second relative positions.

2. Measuring apparatus comprising a member having a series of uniformly spaced discontinuities disposed along a predetermined length of a given axis thereof, said discontinuities forming an integral helical conductive surface of said member having a pitch substantially equal to and coincidental with the spacing between said discontinuities and being proportional to a predetermined scalar quantity, first and second electrical sensor means in fixed relationship to one another and in predetermined capacitive sensing coupling relationships, respectively, with said discontinuities, each of said first and second sensor means comprising a helical conductive surface having the same pitch as said member, and being disposed concentrically about said member and said given axis to sense said discontinuities in a group of at least one discontinuity each to provide respective first and second output signals, each of said first and second output signals being proportional to the relative position of the respective sensor means with respect to the group being sensed thereby, means for moving relatively said first and second sensor means with respect to said group to vary said relative position and capacitance therebetween, each of said first and second sensor means having exclusive first and second relative positions for each discontinuity of the group being sensed thereby to provide a predetermined balanced condition for said first and second signals when both said sensor means are at said respective first relative positions and when both said sensor means are at said second relative positions, comparison means responsive to said first and second output signals to provide an indicating signal having first and second values in the presence and absence, respectively, of said balanced condition, said comparison means comprising a bridge circuit having the respective capacitances between each of the sensor means and respective groups being sensed thereby coupled in the respective arms thereof and output means for said indicating signal, and discriminating means comprising third electric sensor means mounted in fixed relationship to said first and second sensor means and in capacitive sensing coupling relationship with said member discontinuities and responsive to the relative positioning of said first and second sensor means with respect to said member to discriminate between the first values of said indicating signal related to a predetermined one of the two said first and second positions and the first value related to the other of the two said first and second relative positions, said third sensor means comprising a helical conductive surface having the same pitch as said member and being disposed concentrically about said member and said given axis to sense said discontinuities in a group having at least one discontinuity to provide a third output signal proportional to the position of said third sensor means with respect to the group being sensed thereby, said means for moving being further adapted to move relatively said third sensor means with respect to said group being sensed thereby to vary the relative position therebetween, and switching means coupled to said comparison means responsive to the third output signal to effectuate said discrimination between said first values.

3. Measuring apparatus comprising a member having a series of uniformly spaced discontinuities disposed along a given axis thereof, first and second electric sensor means in fixed relationship to one another and in predetermined sensor coupling relationship with at least one of the discontinuities in said member to provide first and second output signals, respectively, each of said first and second output signals being proportional to the relative position of the associated sensor means with respect to the respective discontinuity sensed thereby, means for causing relative movement between said first and second sensor means and said member, comparison means responsive to said first and second output signals for providing an indicating signal having variations as determined by the relative positions of said member with respect to said first and second sensor means and exhibiting a first predetermined value at a first relative positioning of said sensor means with respect to said member and a second predetermined value at a second relative position of said sensor means and said member, discriminating means responsive to the relative positioning of said first and second sensor means with respect to said member for producing a control signal which varies with said relative positioning, and means responsive to said control signal for effectively suppressing one of said predetermined values of said indicating signal.

4. Measuring apparatus comprising a member having a series of uniformly spaced discontinuities disposed along a given axis thereof, first and second electric sensor means in fixed relationship to one another and in predetermined sensor coupling relationship with at least one of the discontinuities in said member to provide first and second output signals, respectively, each of said first and second output signals being proportional to the relative position of the associated sensor means with respect to the respective discontinuity sensed thereby, means for causing relative movement between said first and second sensor means and said member, comparison means responsive to said first and second output signals for providing an indicating signal having variations as determined by the relative positions of said member with respect to said first and second sensor means and exhibiting a first predetermined value at a first relative positioning of said sensor means with respect to said member and a second predetermined value at a second relative positioning of said sensor means and said member, discriminating means responsive to the relative positioning of said first and second sensor means with respect to said member for discriminating against one of said predetermined values of said indicating signal, said discriminating means comprising third electric sensor means arranged in fixed relationship to said first and second sensor means and in predetermined sensing coupling relationship with at least one of the discontinuities in said member to provide a third output signal which is determined by the relative position of said third sensor means with respect to the member discontinuities being sensed thereby, and means responsive to said third output signal for selectively effectuating said discrimination against said one of said predetermined values of said indicating signal.

5. Measuring apparatus comprising an elongated member having a series of uniformly spaced discontinuities disposed along the longitudinal axis thereof, first and second electric sensor means adjacent said elongated member in predetermined capacitive coupling relationship with the discontinuities in said member and in fixed relationship to one another, means for causing relative movement between said first and second sensor means and said member thereby to vary said capacitive coupling relationship, said first and second electric sensor means providing first and second output signals which vary as a predetermined function of the relative positioning of said member with respect to said first and second sensor means, respectively, means for combining said first and second output signals to provide an indicating signal having variations which are determined by the relative positions of said member with respect to said first and second sensor means and exhibiting a first predetermined electric manifestations at a first relative positioning of said sensor means with respect to said member and a second predetermined electric manifestation at a second relative positioning of said sensor means and said member, means responsive to the relative positioning of said first and second sensor means with respect to said member for producing a third signal having a predetermined electric manifestation with respect to said first and second signals, and means responsive to said third signal for selecting one of said predetermined electric manifestations of said indicating signal.

6. Measuring apparatus comprising an elongated member having a series of uniformly spaced discontinuities disposed along the longitudinal axis thereof, first and second electric sensor means adjacent said elongated member in predetermined capacitive coupling relationship with the discontinuities in said member and in fixed relationship to one another, means for causing relative movement between said first and second sensor means and said member thereby to vary said capacitive coupling relationship, said first and second electric sensor means providing first and second output signals which vary as a predetermined function of the relative positioning of said member with respect to said first and second sensor means, respectively, means for combining said first and second output signals to provide an indicating signal having variations which are determined by the relative positions of said member with respect to said first and second sensor means and exhibiting a first predetermined value at a first relative positioning of said sensor means with respect to said member and a second predetermined value at a second relative positioning of said sensor means and said member, and discriminator means responsive to the relative positioning of said first and second sensor means with respect to said member for discriminating against one of said predetermined values of said indicating signal, said discriminator means comprising third electric sensor means in predetermined capacitive sensing coupling relationship with a group of discontinuities in said member to provide a third output signal which is determined by the relative position of said third sensor means with respect to the group being sensed thereby, said means for causing movement further comprising means for moving relatively said third sensor means and said member so as to maintain a predetermined relationship between said third sensor means and said first and second sensor means, and means responsive to said third output signal for selectively effectuating said discrimination against one of said predetermined values of said indicating signal.

7. Apparatus as described in claim 6 wherein each of said first, second and third electric sensor means are coaxially mounted with respect to said elongated member for parallel relative displacement therewith.

8. Measuring apparatus comprising an elongated member having a series of uniformly spaced discontinuities disposed along the longitudinal axis thereof, first and second electric sensor means adjacent said elongated member in predetermined capacitive coupling relationship with the discontinuities in said member and in fixed relationship to one another, means for causing relative movement between said first and second sensor means and said member thereby to vary said capacitive coupling relationship, said first and second electric sensor means providing first and second output signals which vary as a predetermined function of the relative positioning of said member with respect to said first and second sensor means, respectively, means for combining said first and second output signals to provide an indicating signal having variations which are determined by the relative positions of said member with respect to said first and second sensor means and exhibiting a first predetermined value at a first relative positioning of said sensor means with respect to said member and a second predetermined value at a second relative positioning of said sensor means and said member, and discriminator means responsive to the relative positioning of said first and second sensor means with respect to said member for discriminating against one of said predetermined values of said indicating signal, said means for combining comprising a bridge circuit for comparing said first and second output signals provided by said first and second sensor means, respectively, for providing a null signal whenever said first and second output signals are in a predetermined condition of balance as determined by the relative positions of said first and second sensor means with respect to said member and providing an error signal whenever said member and said first and second sensor means are relatively positioned in other than the position producing said null signal, said discriminator means discriminating against alternate one of said null signals.

9. Measuring apparatus comprising a first elongated electrode member having a conductive helical operative surface having a given number of turns of constant pitch disposed along a given length of said member, second and third electrode members each having a helical surface of a predetermined number of turns which are less than the number of turns of said first member and of substantially the same pitch as said first member, said second and third electrode members being mounted in fixed relationship to one another and adjacent said first electrode member in capacitive coupling relationship thereto, means for causing relative movement between said second and third electrode members and said first electrode member thereby to vary the capacitance between said first member and each of said second and third members, comparison means including an electrical bridge circuit for comparing the capacitance formed by said first electrode member and said second electrode member with the capacitance formed by said first electrode member and said third electrode member to provide a null signal when said capacitances are in a predetermined condition of balance as determined by the relative positions of said second and third members with respect to said first member and providing an error signal for other relative positions of said second and third members with respect to said first member, means for indicating the signals provided by said comparison means, and discriminator means responsive to the relative positioning of said second and third electrode members with respect to said first electrode member for discriminating against predetermined ones of said null signals.

10. Apparatus as described in claim 9 wherein said balanced condition of the capacitances formed by said first member with said second and third members, respectively, occurs twice in every said pitch of said helical surface.

11. Apparatus as described in claim 9 wherein said second and third electrode members are coaxially disposed with respect to said first electrode member and in end to end spaced relationship with each other, the axial spacing between corresponding points on the respective turns of said second and third member helical surfaces being substantially equal to an odd multiple of half-pitch lengths.

12. Apparatus as described in claim 9 wherein said discriminator means comprises a fourth electrode member having a helical surface of a predetermined number of turns which is less than the number of turns of said first member and of substantially the same pitch as the turns of said first member, said fourth electrode member being rigidly secured in predetermined spaced relationship to said second and third electrode members and adjacent said first electrode member in capacitive coupling relationship thereto, said means for causing relative movement further comprising means for moving relatively said fourth electrode member and said first electrode member so as to maintain said predetermined spaced relationship between said fourth electrode member and said second and third electrode members, said relative movement producing a change in position between said first and fourth electrode members causing variations in the capacitance formed by said members for controlling the discriminating action of said discriminator means.

13. Apparatus as described in claim 12 wherein said measuring apparatus has a longitudinal axis and the width of said helical surfaces as measured in a direction parallel to said axis is substantially equal to the spacing between adjacent turns of said helical surfaces measured in the same direction.

14. Apparatus as described in claim 12 wherein said fourth electrode member is coaxially disposed with respect to said first electrode member and is axially spaced from said second and third electrode members, the axial spacing between any point on any turn of the helical surface of said fourth member from the corresponding point on any turn of the helical surface of said second and third members being substantially equal to an odd multiple of quarter-pitch lengths.

15. Measuring apparatus comprising a first electrode member having a conductive helical surface having a given number of turns of constant pitch disposed along the longitudinal axis of said member, second, third and fourth electrode members each having a helical surface of a predetermined number of turns which is less than the number of turns of said first electrode member and of substantially the same pitch as that of said first member, said second, third and fourth electrode members being concentrically disposed with respect to the longitudinal axis of said first electrode member and in capacitive coupling relationship thereto, housing means for mounting said second, third and fourth electrode members in predetermined spaced axial relationship to one another and permitting relative axial and relative angular movement between said first member and said second, third and fourth members, means for causing longitudinal relative displacement between said first member and said second, third and fourth members to vary the capacitance therebetween, means for causing relative angular movement between said first member and said second, third and fourth members to vary the capacitance therebetween, comparison means including an electrical bridge circuit for comparing the capacitance formed by said first electrode member and said second electrode member with the capacitance formed by said first electrode member and said third electrode member to provide a null signal when said capacitances are in a predetermined condition of balance as determined by the relative positions of said second and third members with respect to said first member and providing an error signal for other relative positions of said second and third members with respect to said first member, the relative movement producing a change in position between said first and fourth members causing variations in the capacitance formed by said members, and discriminator means comprising said fourth electrode member and an electrical bridge circuit responsive to the capacitance variations of said capacitance formed by said first and fourth members for discriminating against alternate ones of said null signals produced.

16. Apparatus as described in claim 15 wherein the axial spacing between any point on any turn of the helical surface of said second member from the corresponding point on any turn of the helical surface of said third member is substantially equal to an odd multiple of half-pitch lengths and wherein the axial spacing between any point on any turn of the helical surface of said fourth member from the corresponding point on any turn of the helical surface of said second and third members is substantially equal to an odd multiple or quarter-pitch lengths.

References Cited by the Examiner
UNITED STATES PATENTS
2,611,964  9/1952  Buisson _____ 324—61 X FOREIGN PATENTS
827,069  2/1960  Great Britain.

WALTER L. CARLSON, *Primary Examiner.*
SAMUEL BERNSTEIN, *Examiner.*